(12) United States Patent
Rehfus et al.

(10) Patent No.: US 9,545,903 B2
(45) Date of Patent: Jan. 17, 2017

(54) ELECTROMECHANICAL BRAKE ACTUATOR WITH VARIABLE SPEED EPICYCLIC GEARBOX

(71) Applicant: GOODRICH CORPORATION, Charlotte, NC (US)

(72) Inventors: Kevin Rehfus, Troy, OH (US); David Drennen, Bellbrook, OH (US); Robert French, Bevercreek, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 17 days.

(21) Appl. No.: 14/611,857

(22) Filed: Feb. 2, 2015

(65) Prior Publication Data

US 2016/0221555 A1    Aug. 4, 2016

(51) Int. Cl.
| | | |
|---|---|---|
| *B60T 11/04* | (2006.01) | |
| *B60T 7/12* | (2006.01) | |
| *F16H 3/00* | (2006.01) | |
| *F16H 3/44* | (2006.01) | |
| *B60T 13/74* | (2006.01) | |
| *F16H 25/20* | (2006.01) | |
| *F16D 121/24* | (2012.01) | |
| *F16D 125/40* | (2012.01) | |
| *F16D 125/50* | (2012.01) | |

(52) U.S. Cl.
CPC ............... *B60T 11/04* (2013.01); *B60T 7/12* (2013.01); *B60T 13/741* (2013.01); *F16H 3/006* (2013.01); *F16H 3/44* (2013.01); *F16D 2121/24* (2013.01); *F16D 2125/40* (2013.01); *F16D 2125/50* (2013.01); *F16H 2025/2087* (2013.01)

(58) Field of Classification Search
CPC .............. B60T 11/04; B60T 7/12; F16H 3/44; F16H 3/006
See application file for complete search history.

(56) References Cited

U.S. PATENT DOCUMENTS

| | | | | |
|---|---|---|---|---|
| 2,644,533 A | * | 7/1953 | Maillard | ................. B64C 27/18 |
| | | | | 244/17.19 |
| 4,198,881 A | * | 4/1980 | Franch | .................... F16H 33/14 |
| | | | | 475/268 |
| 4,589,611 A | * | 5/1986 | Ramme | .................. B64C 27/10 |
| | | | | 244/12.3 |
| 8,561,938 B2 | * | 10/2013 | Dickman | ................ B64C 27/82 |
| | | | | 244/17.13 |

(Continued)

FOREIGN PATENT DOCUMENTS

| | | |
|---|---|---|
| EP | 2928072 | 10/2015 |
| WO | 2014087813 | 6/2014 |

OTHER PUBLICATIONS

Extended European Search Report dated Jun. 20, 2016 in European Application No. 16153868.1.

*Primary Examiner* — Rodney Butler
*Assistant Examiner* — Frederick Brushaber
(74) *Attorney, Agent, or Firm* — Snell & Wilmer, L.L.P.

(57) ABSTRACT

An electromechanical actuator is provided comprising a housing, a rotor disposed in the housing, an selective gearbox mechanically coupled to the rotor and disposed in the housing, a first output of the selective gearbox configured to rotate at a different speed than the rotor, and a second output of the selective gearbox configured to rotate at a same speed as the rotor.

6 Claims, 4 Drawing Sheets

(56) References Cited

U.S. PATENT DOCUMENTS

| | | | | |
|---|---|---|---|---|
| 8,636,473 B2* | 1/2014 | Brunken, Jr. | ............ | B64C 27/10 244/17.23 |
| 8,640,985 B2* | 2/2014 | Brunken, Jr. | ....... | B64C 29/0033 244/17.23 |
| 8,757,536 B2* | 6/2014 | Tourn | ...................... | B64C 27/18 244/17.11 |
| 2006/0269414 A1* | 11/2006 | Palcic | ..................... | B64C 27/10 416/170 R |
| 2009/0026310 A1* | 1/2009 | Linn | .................... | B64C 11/306 244/65 |
| 2010/0219286 A1* | 9/2010 | Roesch | ................... | B64C 27/26 244/6 |
| 2011/0278109 A1 | 11/2011 | No | | |
| 2013/0068068 A1* | 3/2013 | Witt | .................... | F16H 37/0833 74/661 |
| 2013/0146007 A1* | 6/2013 | Richter | ................... | F01L 1/352 123/90.17 |
| 2014/0000993 A1 | 1/2014 | No | | |

* cited by examiner

ELECTROMECHANICAL BRAKE ACTUATOR WITH VARIABLE SPEED EPICYCLIC GEARBOX

FIELD OF INVENTION

The present disclosure relates to vehicle braking systems, and, more specifically, to an epicyclic gearbox coupled to an electromechanical brake actuator.

BACKGROUND

Braking for aerospace applications traditionally makes use of hydraulic piston adjusters, which may respond to input quickly. Recently, some applications for aerospace braking applications have made use of electromechanical piston actuators. These electromechanical actuators (EMA) may respond to input relatively slowly compared to their hydraulic counterparts.

Electric actuation typically does not match the response speed of hydraulic actuation. The reason for this is that in electric braking, an electric motor is used to drive through a gear train that is used to then drive a ball screw piston. The gear train serves the purpose of increasing the motor torque to obtain the high linear forces that are needed for aircraft braking. By increasing the motor's output torque through the gear train, the output actuation speed is decreased by the same ratio. For instance, the targeted actuation speed of an EMA may be selected to meet desired characteristics. However, increasing the speed output from the EMA may reduce the available torque at the output.

Reduced running clearance positions may be used to reduce the distance that an EMA actuates to apply braking force. However, a reduced running clearance position may lead to dragging brakes.

SUMMARY

An electromechanical actuator may comprise a housing, a rotor disposed in the housing, a selective gearbox mechanically coupled to the rotor and disposed in the housing, a first output of the selective gearbox configured to rotate at a different speed than the rotor, and a second output of the selective gearbox configured to rotate at a same speed as the rotor.

In various embodiments, the actuator may further comprise a mechanism to selectively engage the first output or the second output. The mechanism may comprise a voice coil. The selective gearbox may have a gear ratio of at least 25 to 1. The selective gearbox may comprise a first stage of planet gears and a second stage of planet gears. The electromechanical actuator may be configured to move a puck.

A braking system may comprise a non-transitory memory communicating with a controller, the non-transitory memory having instructions stored thereon that, in response to execution by the controller, cause the controller to perform operations. The operations may comprise measuring a load on an electromechanical actuator, comparing the load to a threshold value, and selecting a gear in response to a result of the comparison.

In various embodiments, the operations may further comprise measuring the load on the electromechanical actuator using a load cell. The controller may select a high speed output of a selective gearbox in response to the load on the electromechanical actuator being below the threshold value. The controller may select a high torque output from the selective gearbox in response to the load on the electromechanical actuator being above the threshold value. The high speed output may be configured to rotate at a greater angular velocity than the high torque output. The high speed output may be configured to rotate at a same angular velocity as a rotor of the electromechanical actuator. The selective gearbox has a gear ratio of at least 25 to 1. The controller may command a voice coil to engage the high speed output or the high torque output. The threshold value may be 20% of a capacity of the electromechanical actuator.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
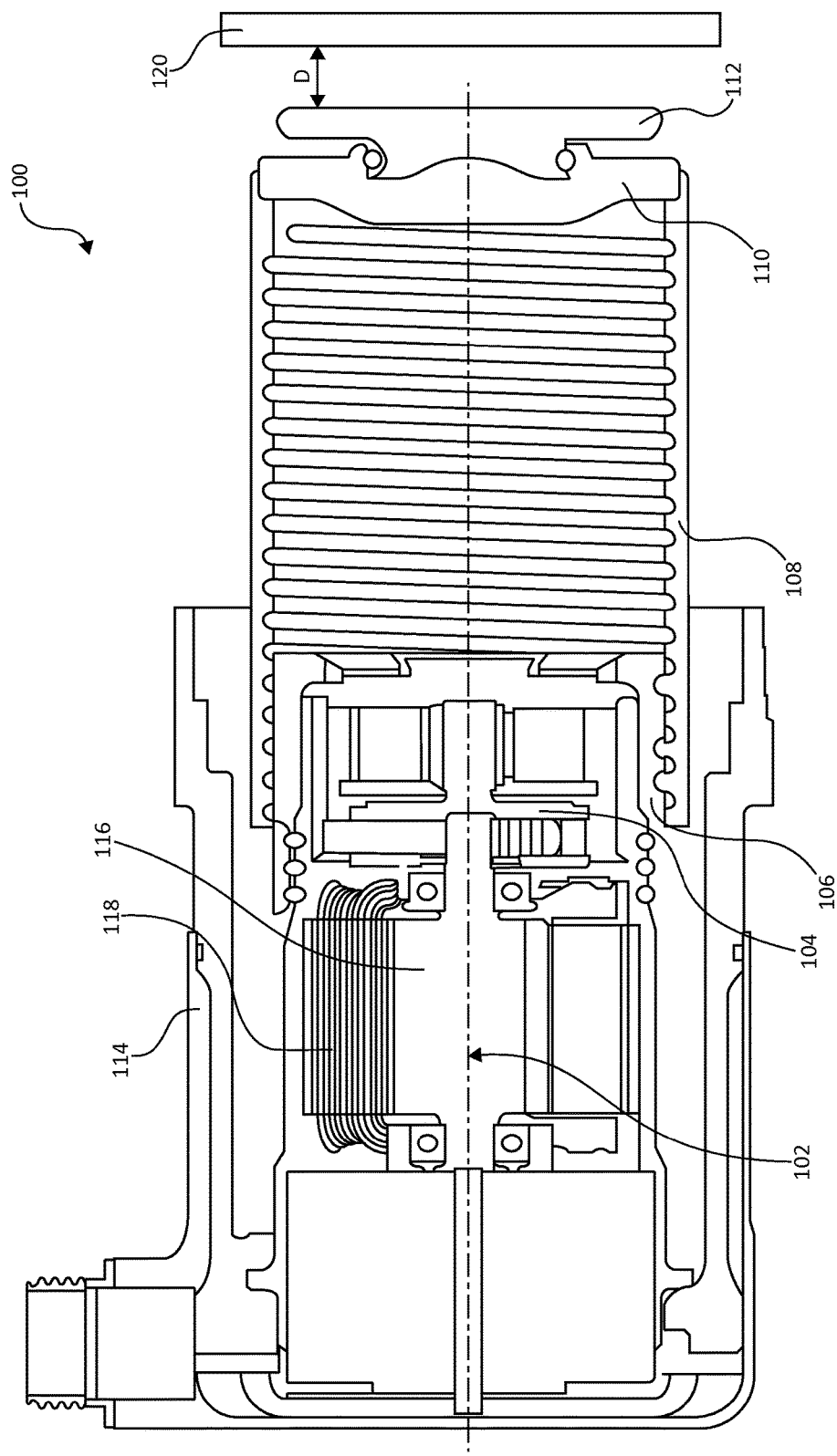
FIG. 1 illustrates a cross-sectional view of an electromechanical actuator with a variable speed gearbox, in accordance with various embodiments.

With reference to FIG. 1, an electromechanical actuator 100 is illustrated according to various embodiments. Electromechanical actuator 100 may be configured to rotate about axis of rotation 102. An epicyclic gearbox 104 may be contained within housing 114 of electromechanical actuator 100. In various embodiments, epicyclic gearbox 104 may be a type of selective gearbox and other types of selective gearboxes may be used. Rotor 116 (i.e., a motor shaft) of electromechanical actuator 100 rotates about axis of rotation 102 in response to excitation of coils 118. Rotor 116 provides rotational input to epicyclic gearbox 104.

In various embodiments, epicyclic gearbox may adjust the angular velocity and torque of the rotational input and rotate ball screw 106 as a linear output. Ball screw 106 may then urge ball nut 108 to translate along axis of rotation 102. An endcap 110 may be disposed at an end of ball nut 108 opposite epicyclic gearbox 104. Endcap 110 may support puck 112, which applies brake pressure against braking surface 120. Puck 112 and braking surface 120 may have a running clearance position with a distance D separating the two surfaces. Epicyclic gearbox 104 may comprise multiple speed settings to actuate brakes at different speeds and with different pressures.

Figure 2:
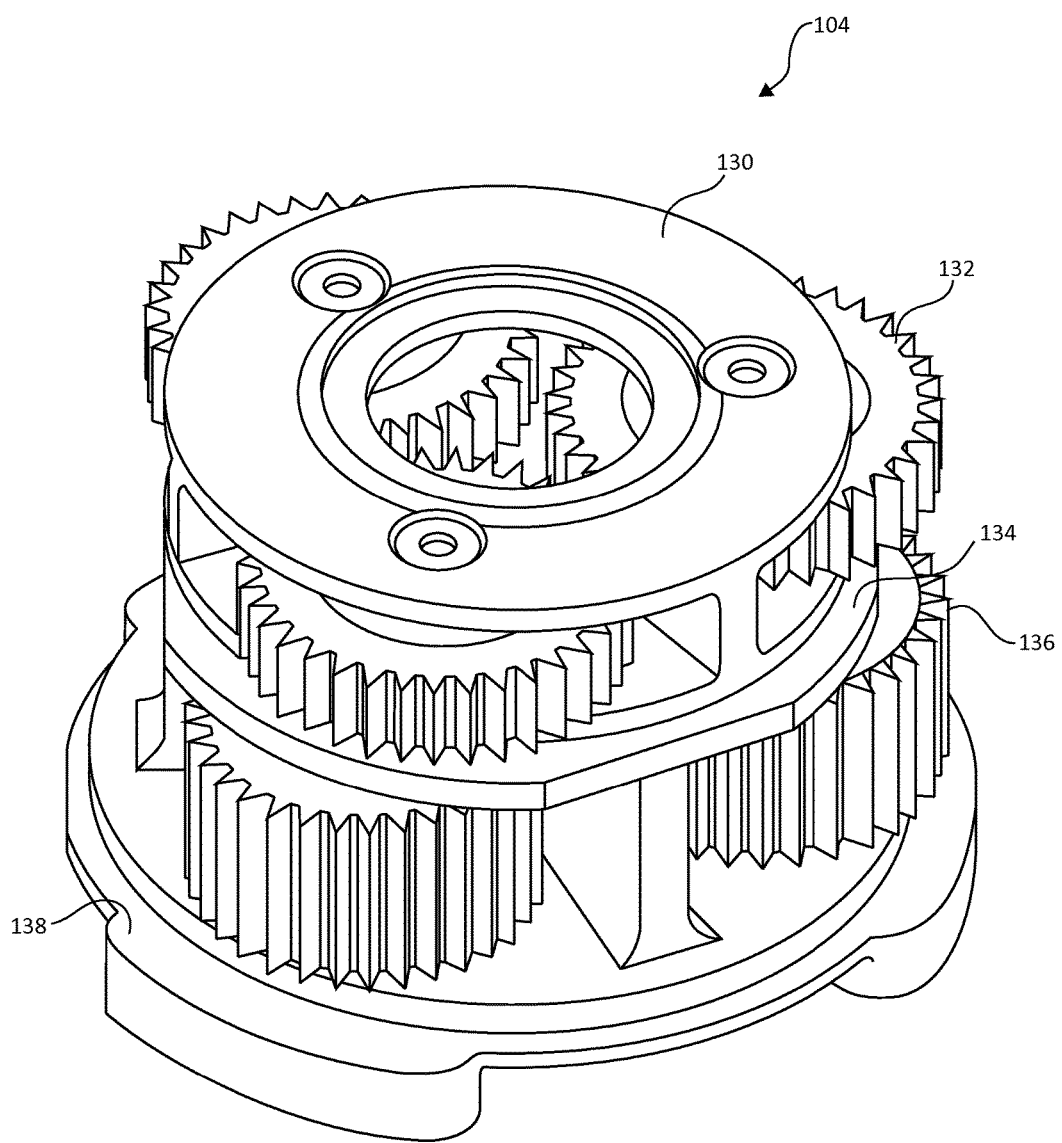
FIG. 2 illustrates a variable speed epicyclic gearbox, in accordance with various embodiments.

With reference to FIG. 2, a portion of an epicyclic gearbox 104 is shown, in accordance with various embodiments. Epicyclic gearbox 104 may comprise first stage carrier 130 containing first stage planet gears 132. First stage planet gears 132 are mounted for rotation with respect to epicyclic gearbox 104. First stage carrier 130 may rotate relative to second stage carrier 134. Second stage carrier 134 may house second stage planet gears 136, second stage planet gears 136 being mounted for rotation on second stage carrier 134. Second stage planet gears 136 may rotate relative to second stage carrier 134. Second stage output plate 138 may be configured to engage a ball nut to actuate a brake.

Figure 3:
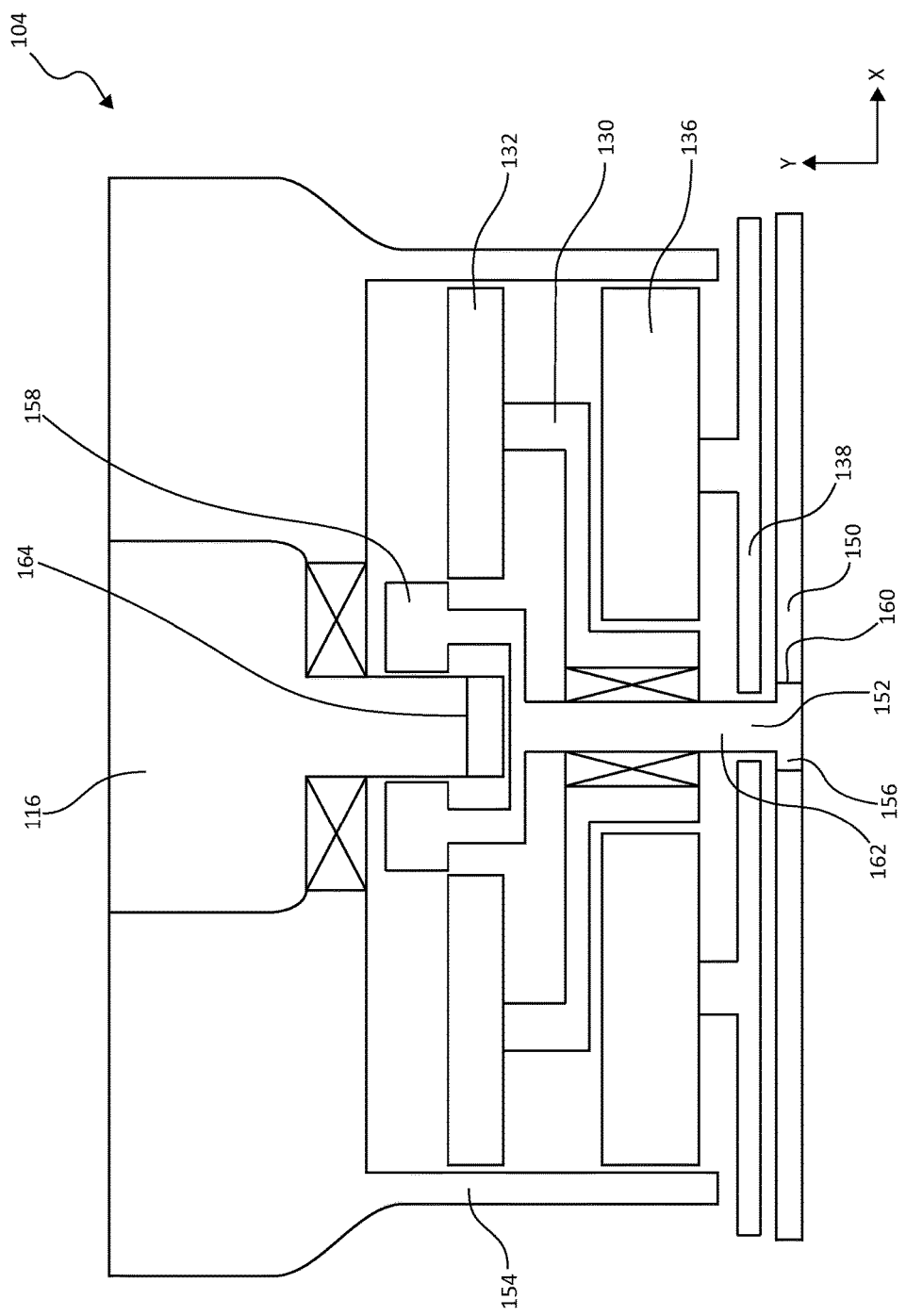
FIG. 3 illustrates a cross-sectional view of an epicyclic gearbox in accordance with various embodiments.

With reference to FIG. 3, a cross sectional view of epicyclic gearbox 104 is shown, in accordance with various embodiments. An xy axis is provided for convenience. Epicyclic gearbox 104 may have a mechanism to provide various output speeds and torques based on a single input speed and torque. As illustrated in FIG. 3, epicyclic gearbox 104 may comprise two speed outputs. Rotor 116 may provide mechanical energy in the form of angular velocity. Rotor 116 may rotate fast drive mechanism 152. Fast drive mechanism 152 may selectively engage fast drive output plate 150 by mechanically coupling interface gear 156 with fast drive output plate 150 at interface surface 160 of fast drive output plate 150. Shafting 162 of fast drive mechanism 152 may extend between interface gear 156 and gear interface 158 of fast drive mechanism 152.

In various embodiments, fast drive mechanism 152 of epicyclic gearbox 104 is engaged with fast drive output plate 150 and may bypass the gearing provided by first stage planet gears 132 and second stage planet gears 136. When engaged in fast drive output plate 150, epicyclic gearbox 104 may rotate fast drive output plate 150 through rotor 116. Fast drive output plate 150 may thus rotate at approximately the same angular velocity with approximately the same torque as provided by rotor 116. Thus, there may be a 1:1 correspondence between revolutions of fast drive output plate 150 and rotor 116. In this regard, the rotational output of fast drive output plate 150 is of the same torque and angular velocity as rotor 116.

In various embodiments, fast drive mechanism 152 may slide along the x axis to disengage interface gear 156 from fast drive output plate 150 by moving away from fast drive output plate 150 in a y direction and, instead, engage first stage planet gear 132 by mechanically engaging gear interface 158 of fast drive mechanism 152 with first stage planet gears 132. Rotor 116 may then drive first stage planet gears 132 and rotate first stage planet gears 132. First stage planet gears 132 may mechanically interface with ring gear 154. First stage carrier 130 may mechanically interface with second stage planet gears 136. Second stage planet gears 136 may be coupled to second stage output plate 138. Second stage output plate 138 may rotate to provide an output at a different angular velocity than was input by rotor 116.

In various embodiments, epicyclic gearbox 104 may take a given input angular velocity and torque through gearing to decrease the angular velocity and increase the torque seen at the output. For example, the output when fast drive mechanism 152 engages fast drive output plate 150 may be 54 times as fast as the output speed when fast drive mechanism 152 engages first stage planet gears 132 (i.e., a 54:1 ratio of input angular velocity to output angular velocity at second stage output plate 138). Thus, the angular velocity at which a ball screw moves may be increased by disengaging first stage planet gear 132 and the torque may be increased by engaging first stage planet gear 132. As a result, an actuator with the two speed gear box may close a relatively large stand-off distance (i.e. distance D in FIG. 1) in 1/54 the time an actuator using a standard fixed gear ratio gear box might use. Similarly, the gearing may be selected to apply a desired amount of torque as the pressure applied through the puck increases.

In various embodiments, fast drive mechanism 152 may be moved to engage or disengage different gearing using an engagement mechanism 164 such as a solenoid, springs, and/or a voice coil, for example. Springs may be configured to automatically shift the fast drive mechanism in response to an increased load at the puck. The illustrated voice coil configuration may be controlled by a hardware/software combination. In that regard, the position of fast drive mechanism 152 may be controlled.

Figure 4:
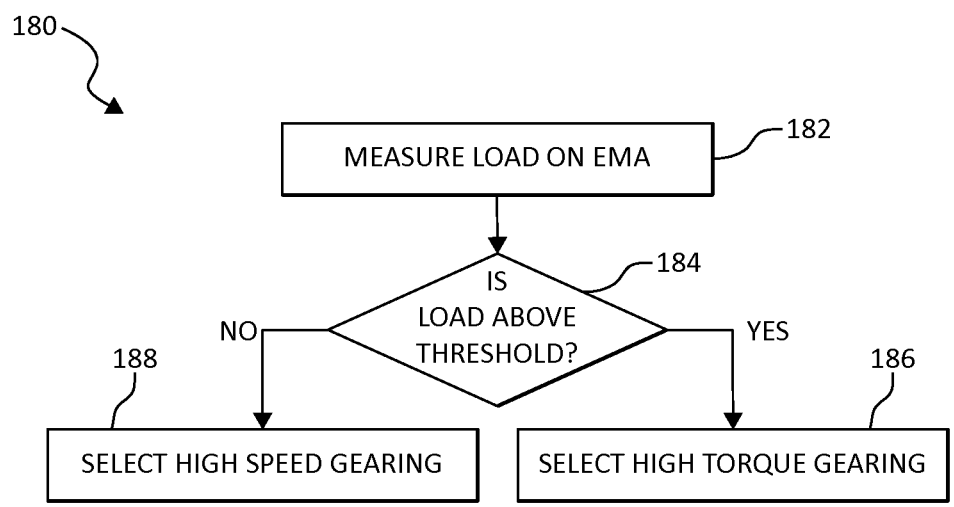
FIG. 4 illustrates a process for controlling an epicyclic gear box in an electromechanical actuator, in accordance with various embodiments.

With reference to FIG. 4, a method 180 of controlling epicyclic gearbox 104 of FIG. 3 is shown, in accordance with various embodiments. As discussed herein, various aspects of the present disclosure may be implemented in various logical units of a processor having a non-transitory memory. In various embodiments, various aspects may be implemented in multiple processors and/or memories. For example, the disclosed system may be implemented within a brake controller configured to control a voice coil. A brake controller may control a voice coil by sending an electrical current through the coil to position a magnetic member. Method 180 may be carried out in a brake control unit or another controller on an aircraft.

In various embodiments, the gearing may be selected based on the perceived load on an EMA. To that end, the system measures the load on the EMA (Step 182). The load may be detected using the electronic signal from a load cell on the EMA. The EMA may have a known capacity for torque at each of the available gearing settings. Thus, a threshold may be set to shift between gear settings at a threshold (e.g., at 20% of maximum capacity).

In various embodiments, the system may determine if a load is above a threshold value (Step 184). For example, the EMA may be in a running clearance position and begin actuating the brakes. The brakes close the running clearance distance (i.e. distance D in FIG. 1) using a minimal amount of torque in a high speed gear. The load measured during the closing period may be, for example, 10%. The measured 10% load may be less than 20% of the EMA capacity (the predetermined shifting threshold in this example), so the system selects the high speed gearing (Step 188). As the system applies braking force, the EMA runs at higher load levels. For example, as the EMA is applying braking force, the load measured on the EMA may be 80% of capacity. Since the 80% measured load is above the threshold value of 20% the system may select high torque (and lower speed) gearing (Step 186). The system may select different gearing using engagement mechanism 164 (of FIG. 3) to actuate fast drive mechanism 152 (also of FIG. 3). The system may also select a gear in response to a load being below a threshold.

In various embodiments, the EMA and shifting system described herein may provide a high speed setting for quickly closing the running clearance position. A high torque setting may be used when the braking system is applying braking force. Thus, the above system may provide a shorter response time by increasing the average speed over a one speed EMA. For example, the targeted (i.e., minimum required) actuation speed of an EMA may be 0.4 inches (1 cm) per second on average. The EMA may move at 21.6 inches (54.9 cm) per second in the high speed gearing. Having a 54 to 1 gearing ratio, for example, would mean the EMA moves at 0.4 inches (1.0 cm) per second in the high torque gearing. In various embodiments, the gearing ratio may be at least 25 to 1.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator, comprising:
   a housing;
   a rotor disposed in the housing and configured to rotate about an axis of rotation;
   a selective gearbox mechanically coupled to the rotor and disposed in the housing;
   a first output of the selective gearbox configured to rotate at a different angular velocity than the rotor; and
   a second output of the selective gearbox configured to rotate at a same angular velocity as the rotor;
   wherein the housing, the rotor, and the selective gearbox are coaxial relative to the axis of rotation.

2. The electromechanical actuator of claim 1, further comprising a mechanism to selectively engage the first output or the second output, wherein the mechanism is configured to automatically switch between the first output and the second output in response to a load along the axis of rotation.

3. The electromechanical actuator of claim 2, wherein the mechanism comprises at least one of a voice coil, a spring, or a solenoid.

4. The electromechanical actuator of claim 2, wherein the electromechanical actuator is configured to move a puck, wherein the load is dependent on a relative position of the puck.

5. The electromechanical actuator of claim 1, wherein the selective gearbox has a gear ratio of at least 25 to 1.

6. The electromechanical actuator of claim 1, wherein the selective gearbox comprises a first stage of planet gears and a second stage of planet gears, wherein the first stage of planet gears and the second stage of planet gears are both coaxial relative to the axis of rotation.

* * * * *